(12) United States Patent
Schaal et al.

(10) Patent No.: US 7,802,767 B2
(45) Date of Patent: Sep. 28, 2010

(54) HOLDING DEVICE FOR STORING SUNDRY ITEMS

(75) Inventors: Falk Schaal, Alpirsbach (DE); Jochen Bisinger, Esslingen (DE)

(73) Assignee: Fischer Automotive Systems GmbH & Co. KG, Horb (DE)

( * ) Notice: Subject to any disclaimer, the term of this patent is extended or adjusted under 35 U.S.C. 154(b) by 0 days.

(21) Appl. No.: 12/468,184

(22) Filed: May 19, 2009

(65) Prior Publication Data

US 2009/0289162 A1    Nov. 26, 2009

(30) Foreign Application Priority Data

May 21, 2008    (DE) .................. 10 2008 024 695

(51) Int. Cl.
*A47K 1/08* (2006.01)
(52) U.S. Cl. .................. 248/311.2; 248/310; 224/281; 220/737
(58) Field of Classification Search ............. 248/311.2, 248/313, 314, 310; 220/737; 224/926, 281
See application file for complete search history.

(56) References Cited

U.S. PATENT DOCUMENTS

| | | | | |
|---|---|---|---|---|
| 4,613,048 A * | 9/1986 | McGill | ............ | 224/400 |
| 5,071,002 A * | 12/1991 | Bradley | ............ | 206/217 |
| 5,170,980 A * | 12/1992 | Burrows et al. | ............ | 248/311.2 |
| 5,390,887 A * | 2/1995 | Campbell | ............ | 248/311.2 |
| 5,702,041 A * | 12/1997 | Sun et al. | ............ | 224/539 |
| 5,878,986 A * | 3/1999 | Sun et al. | ............ | 248/311.2 |
| 6,330,955 B2 * | 12/2001 | Easler, Sr. | ............ | 220/507 |
| 7,168,669 B2 * | 1/2007 | Park | ............ | 248/311.2 |
| 7,213,793 B2 * | 5/2007 | Sturt et al. | ............ | 248/311.2 |
| 7,341,297 B2 | 3/2008 | Nakamura et al. | | |
| 7,387,304 B1 * | 6/2008 | Rich et al. | ............ | 280/47.131 |
| 7,469,870 B2 * | 12/2008 | Brandin et al. | ............ | 248/311.2 |
| 7,487,946 B2 * | 2/2009 | Thomas | ............ | 248/311.2 |
| 7,510,158 B1 * | 3/2009 | Terry et al. | ............ | 248/313 |
| 7,520,405 B2 * | 4/2009 | Ishida et al. | ............ | 220/737 |
| 2001/0023872 A1* | 9/2001 | Schierling et al. | ............ | 220/737 |
| 2006/0237611 A1* | 10/2006 | Sturt et al. | ............ | 248/311.2 |
| 2006/0237612 A1* | 10/2006 | Thomas | ............ | 248/311.2 |
| 2009/0014616 A1* | 1/2009 | Schaal | ............ | 248/311.2 |

FOREIGN PATENT DOCUMENTS

| | | |
|---|---|---|
| DE | 103 16 817 | 10/2004 |
| DE | 103 22 299 | 12/2004 |
| JP | 2005297956 A * | 10/2005 |

* cited by examiner

*Primary Examiner*—Kimberly T Wood
(74) *Attorney, Agent, or Firm*—Michael J. Striker

(57) ABSTRACT

A holding device for storing sundry items has a base body with a receiver in form of a cupholder and is associated with an insert member which can be inserted into the receiver of the base body, and the insert member has a holding recess by which opposing segments are separated from one another.

9 Claims, 3 Drawing Sheets

HOLDING DEVICE FOR STORING SUNDRY ITEMS

CROSS-REFERENCE TO RELATED APPLICATION

The invention described and claimed hereinbelow is also described in German Patent Application DE 10 2008 024 695.6 filed on May 21, 2008. This German Patent Application, whose subject matter is incorporated here by reference, provides the basis for a claim of priority of invention under 35 U.S.C. 119(a)-(d).

BACKGROUND OF THE INVENTION

The invention relates to a holding device for storing sundry.

Such holding devices are known from the prior art for releasable or fixed incorporation into a receiving cavity provided for that purpose, for example, in an instrument panel or central console of a motor vehicle. Such a holding device has already been disclosed in U.S. Pat. No. 5,878,986 or U.S. Pat. No. 5,702,041, which holding device comprises a base body having three cylindrical cavities in the form of cupholders arranged side by side. An insert member can be inserted in the manner of a bayonet into the middle cavity in particular, the other two cavities thereby being separated from one another.

The insert member comprises spring arms which project into each lateral cavity and by means of which the opening cross-section of the two cavities can be varied for the insertion of different containers. However, when the insert member is inserted, the two lateral cavities can be used only as cupholders or as small compartments, so that bulkier items, such as papers, CD cases or the like, can no longer be deposited therein. The region of the insert member cannot be used for storing sundry items at all.

DE 103 22 299 B4, moreover, discloses a holding device comprising a base body which can be inserted into a receiving cavity or receiving chamber in a central console. On the one hand, two substantially circular recesses have been created in the cube-shaped base body, so that receptacles which can be used as cupholders are formed. If, on the other hand, the base body is to be used to accommodate cassette or CD cases, for example, then the base body can be removed from the receiving chamber and re-inserted into the receiving chamber in an inserted position rotated through 90°. Two substantially rectangular recesses have been created in the upper side of the base body, which then faces the user, so that cassette or CD cases can be inserted.

SUMMARY OF THE INVENTION

The object of the present invention is to produce a holding device which is easy to handle in order to provide the corresponding receiving functions and which is more suitable for accommodating different sundry items.

In order to produce a holding device, by means of which various holding functions can be provided in an extremely user-friendly manner and by means of which different sundry items can better be accommodated, it is provided according to the invention that the insert member comprises a holding recess which separates opposing segments from one another. In other words, there is provided according to the invention a further component in the form of an insert member which can be inserted into the at least one receiver of the base body in order thereby to be able to provide further receiving and holding functions for sundry items and which, because of the holding recess, is highly suitable for accommodating even bulky items such as, for example, papers, CD cases or the like.

In contrast to the prior art according to U.S. Pat. No. 5,878,986 or U.S. Pat. No. 5,702,041, the insert member is accordingly in such a form that it can itself accommodate bulky items, or items are able to project through the holding recess. Items can accordingly also be deposited in the region of the insert member, which is not possible in the above-mentioned prior art.

Consequently, if the holding device is to be used, for example, in particular as a cupholder for receiving bottles, glasses, beakers or the like, then the insert member can be correspondingly removed from the base body. As a result, the receiver of the base body is freed and is then used to accommodate the corresponding container.

If, on the other hand, the holding device is to fulfil a storage or holding function for, for example, cassette or CD cases, for books, papers, mobile telephones, pens or the like, then this can preferably be achieved by inserting or introducing the insert member into the receiver provided therefor. Additional storage space or an additional storage compartment is provided by the holding recess in the insert member.

In a further embodiment of the invention, it has been found to be particularly advantageous if the base body is rotationally symmetrical and is arranged in the receiver to be rotatable about an axis of rotation. Firstly, because of its rotationally symmetrical form, the insert member can easily be inserted into the receiver provided therefor in the base body. Furthermore, by rotation about its axis of rotation, the insert member can easily be adjusted in order, for example, to be able to provide a storage and holding function which can be adapted to requirements. In contrast to the prior art according to U.S. Pat. No. 5,878,986 or U.S. Pat. No. 5,702,041, the insert member can be rotated fully through 360° without the insert member becoming disengaged from the receiver. This obviously results in extremely user-friendly handling and adjustment of the insert member.

In a further embodiment of the invention it has additionally been found to be advantageous if the receiver is in the form of a sub-region of a holding opening of the base body. Accordingly, the base body advantageously has a holding opening which extends beyond the receiver for the insert member so that it can accommodate, for example, wider and bulkier items such as cassette and CD cases, books or papers.

The holding opening is preferably in the form of a holding slot, the width of which is smaller than the diameter of the receiver for the insert member. In other words, the holding slot accordingly comprises two regions in which there are bays whose cross-sections are substantially shaped like a segment of a circle, so as to form a receiver that can be used as a cupholder. It is also possible for the receiver to have a larger diameter than the corresponding width of the holding slot only over part of the height of the holding slot. In other words, the bays can also have corresponding shoulders so that, for example, different receiver diameters can be provided for different sizes of bottle, glass, beaker or the like.

It has additionally been found to be advantageous if the receiver is arranged substantially centrally in the holding opening or holding slot. In other words, a corresponding sub-region of the holding opening or holding slot is located on either side of the receiver, which sub-region can, if required, be divided by means of the insert member so that individual receiver compartments are formed.

It is further advantageous if the holding recess of the insert member is adapted to the holding opening of the base body. It is thus possible, overall, to produce a holding opening or holding slot which has a continuous contour, so that correspondingly bulky items can be accommodated.

In a further embodiment of the invention, receiving openings are provided in each of the opposing segments of the insert member. The receiving openings are suitable on the one hand as engagement openings for the manual adjustment, in particular the rotation, of the insert member. On the other hand, they are used for the simple removal or insertion of the insert member. Finally, the receiving openings can also be used to accommodate, for example, pens or the like.

In a further embodiment of the invention, the base body of the holding device has on its upper side a border which extends around the holding opening and the receiver for the insert member. The border in particular prevents dirt from entering the holding opening or the receiver of the base body.

In addition, it has been found to be advantageous if the insert member is adjustable infinitely in different rotational positions or in a plurality of adjustment steps. The contour of the holding opening or holding slot can thereby be changed, or the holding opening as a whole can be divided into several storage compartments.

In addition, it has been found to be advantageous if the insert member is rotatably mounted on a bottom of the base body by way of a pivot bearing. As a result, the insert member is mounted particularly advantageously, which in turn means that the insert member is particularly simple to handle.

Further advantages, features and details of the invention will become apparent from the following description of a preferred embodiment and with reference to the drawings.

DESCRIPTION OF THE PREFERRED EMBODIMENTS

Figure 1:
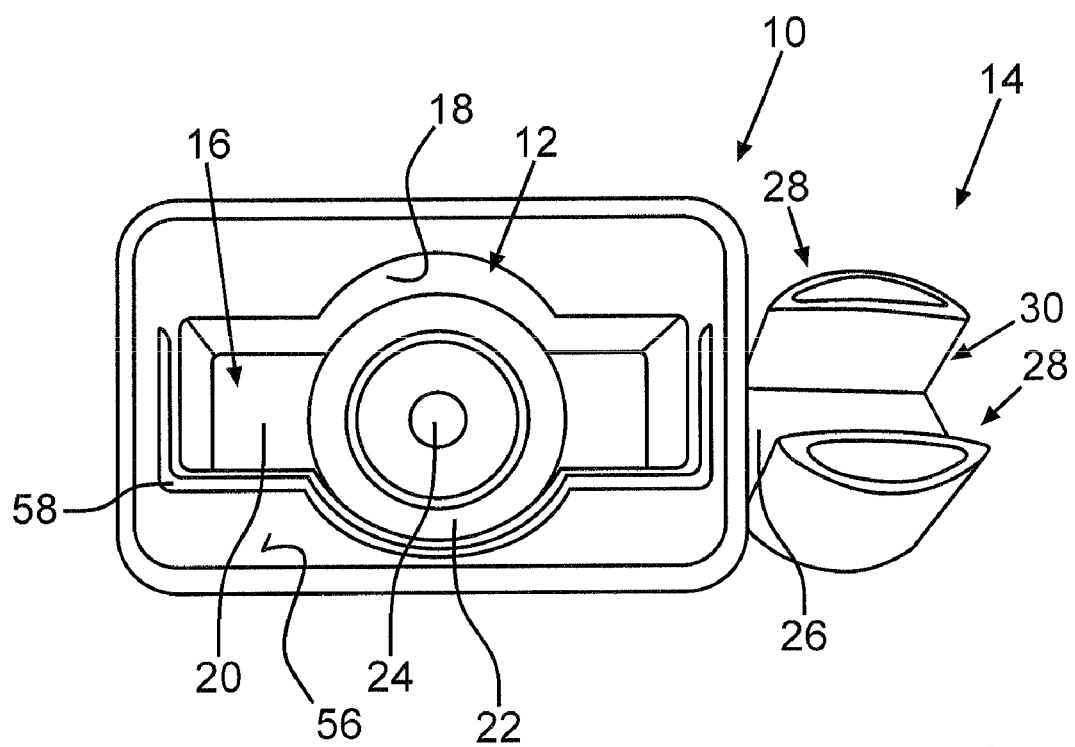
FIG. 1 shows a top view in light perspective of a holding device for storing sundry items, having a base body which has a receiver in the form of a cupholder, which receiver is arranged approximately centrally in a holding opening in the form of a holding slot, it being possible to insert into the receiver an insert member (shown separately) which has a holding recess which separates opposing segments from one another.
Figure 2:
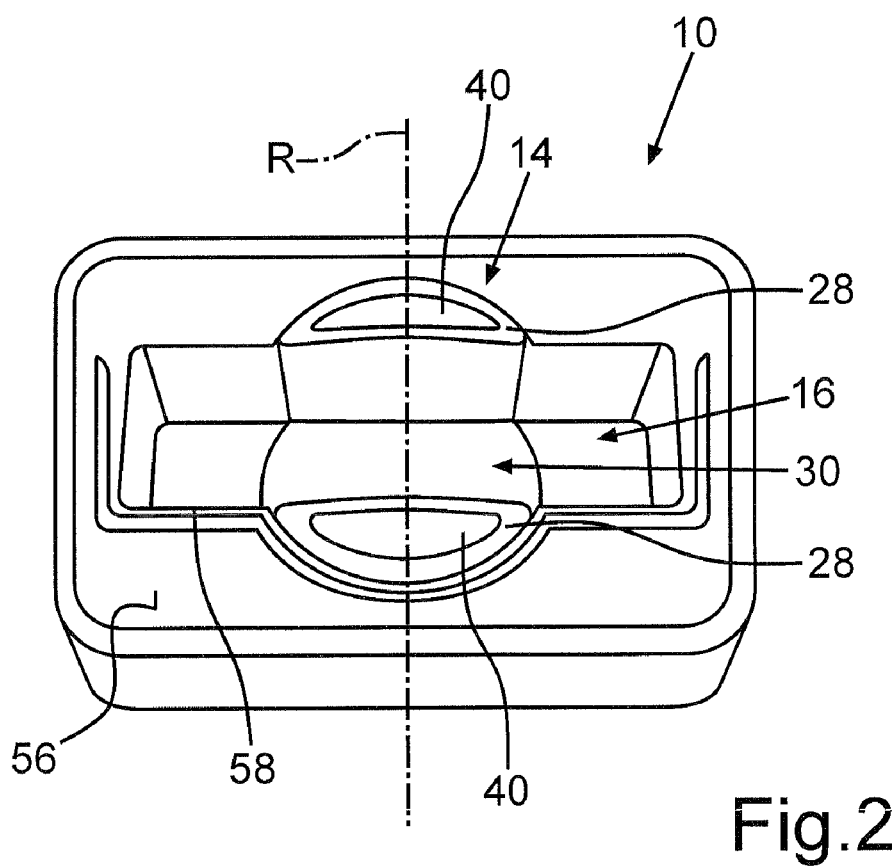
FIG. 2 shows a top view in light perspective of the holding device according to FIG. 1, in which the insert member has been inserted into the receiver of the base body and in which it can be seen that the holding recess of the insert member is adapted to the holding opening of the base body.

FIGS. 1 and 2 each show a top view in light perspective of a holding device for storing sundry items, which holding device can be inserted, for example, into a corresponding receiving compartment or receiving cavity in an instrument panel or central console of a motor vehicle. It would be conceivable for the holding device to be positioned releasably or fixedly inside the corresponding receiving cavity or receiving chamber within the instrument panel or central console.

It is to be regarded as being within the scope of the invention that the holding device can also be arranged at any other location inside a passenger compartment of a motor vehicle, for example a driver's cab of a lorry or a passenger compartment of a car. In addition, it would also be conceivable to use the holding device in the non-inserted state, that is to say, for example, as a standing arrangement on a desk or the like.

The holding device essentially comprises a cube-shaped base body 10 in which there has been created a receiver 12 for an insert member 14, which is shown as a separate component next to the base body 10. In the present case, the receiver 12 is arranged approximately centrally in a holding opening 16 of the base body 10, which holding opening 16 in the present case is substantially in the form of a holding slot.

Because the holding opening 16 is also provided in addition to the receiver 12, the receiver 12 is substantially formed by two bays 18 in the holding opening 16, the cross-sections of which bays 18 are shaped like a segment of a circle. In other words, the diameter of the receiver 12 is larger than the width of the holding slot or holding opening 16. It is also possible for the receiver 12 to have a larger diameter than the holding opening 16 only over part of the height of the holding slot 16. Likewise, it would be conceivable for the receiver 12 to have different diameters over its height so as to be able to accommodate different bottles, cans, glasses, cups or similar containers. The receiver 12 serves as a cupholder, as will be explained further hereinbelow in connection with FIG. 3.

It will additionally be seen from FIG. 1 in particular that an annular groove 22 is formed in the bottom 20 of the holding opening 16, which groove 22 is adapted to a corresponding contour on the bottom of the insert member 14. Furthermore, a pivot bearing 24, which in the present case is in the form of a hole-like indentation or recess, is also to be seen, into which pivot bearing a pin (not shown) on the bottom of the insert member 14 can engage.

In the present case, the insert member 14 is rotationally symmetrical and consequently has a bottom 26 which is shaped like a segment of a circle. From the bottom 26 there project upwards two segments 28 whose cross-sections are substantially shaped like a segment of a circle and which delimit laterally a holding recess 30 of the insert member 14.

It will be seen from FIG. 2 in particular that the outside diameter of the insert member 14 is adapted to the inside diameter of the receiver 12. The pivot bearing 24 ensures that the insert member 14 is held on the bottom 20 of the base body 10 to be rotatable about an axis of rotation R, which is shown diagrammatically.

In FIG. 2, the insert member 14 is in a rotational position in which the holding slot or holding opening 16 of the base body 10 and the holding recess 30 of the insert member 14 are in alignment with one another. Accordingly, the holding recess 30 forms part of the holding opening 16, so that a continuous holding slot is formed. The basic contour or U-shaped cross-section of the holding recess 30 of the insert member 14 is adapted to that of the holding opening 16 or holding slot.

The base body 10 has on its upper side 56 a border 58 which extends around the holding opening 16 or the receiver 12. The border 58 is intended in particular to prevent dust from entering the holding opening 16 or the receiver 12.

Figure 3:
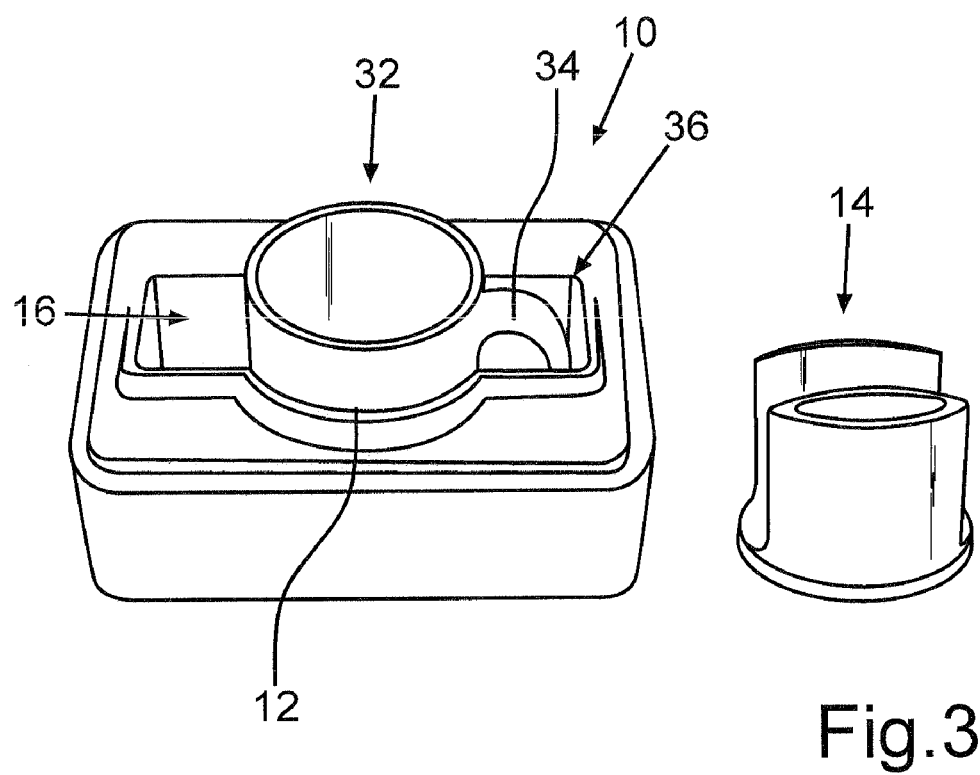
FIG. 3 shows a perspective view of the holding device according to FIGS. 1 and 2, in which the insert member has been removed so that a cup can be accommodated in the receiver of the base body.

FIG. 3 shows a perspective view of the holding device according to FIGS. 1 and 2, in which the insert member 14 has in this case been removed so that a cup 32 can be positioned inside the receiver 12 of the base body 10. A handle 34 of the cup 32 projects into a lateral sub-region 36 of the holding opening 16 inside the base body 10.

Figure 4:
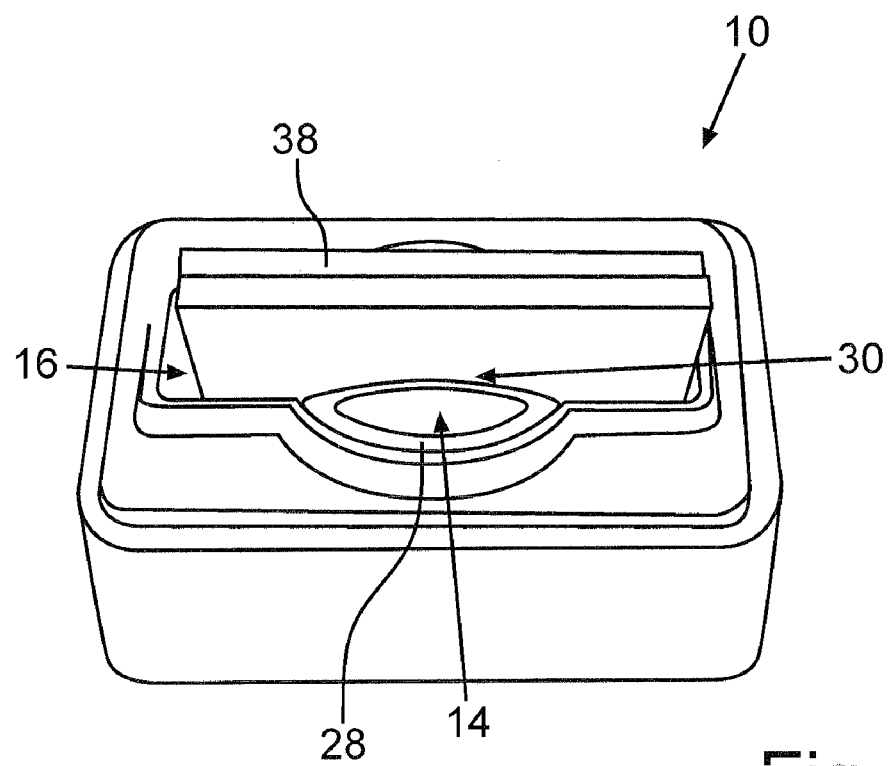
FIG. 4 shows a perspective view of the holding device according to FIGS. 1 to 3, in which the insert member has been inserted according to FIG. 2 into the receiver of the base body and a plurality of CD cases have been inserted into the holding opening of the base body.

FIG. 4 shows the holding device according to FIGS. 1 to 3, in which the insert member 14 is in the position already shown in FIG. 2. In that position, in which a continuous holding slot or holding opening 16 is formed, a plurality of CD cases 38 can be accommodated without difficulty. Likewise, this large holding opening 16 is suitable for accommodating relatively small books, mobile telephones, papers or the like.

Figure 5:
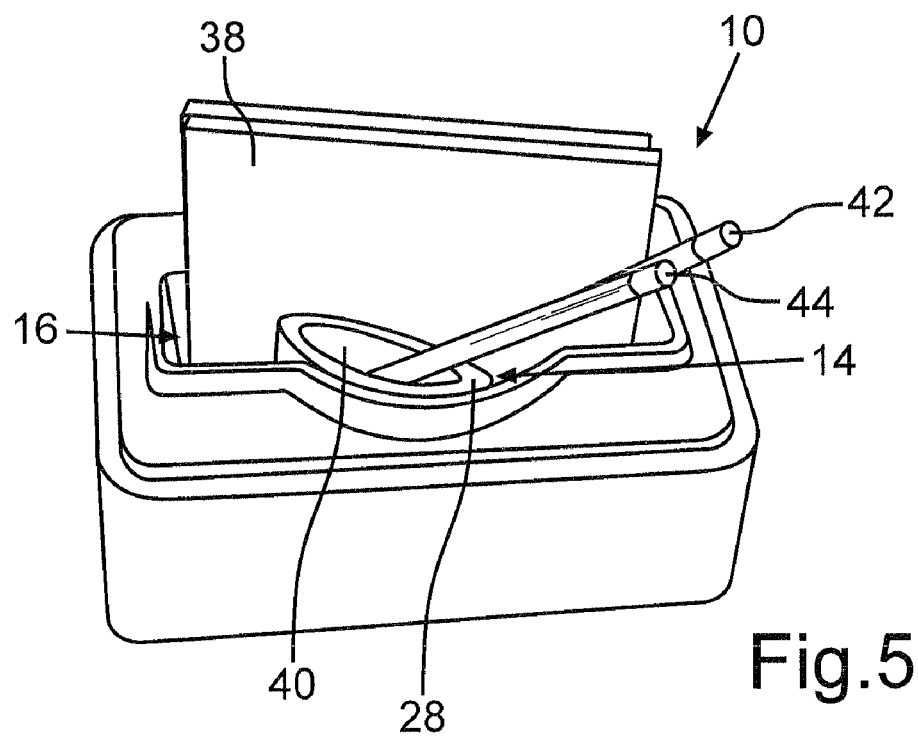
FIG. 5 shows a perspective view of the holding device according to FIGS. 1 to 4, in which the rotationally symmetrical insert member has been so rotated about its axis of rotation that a CD case is correspondingly clamped inside the holding opening, and in which a pen is positioned in a receiving opening of the corresponding segment of the insert member.

FIG. 5 shows a perspective view of the holding device analogous to FIG. 4, in which the insert member 14 has in this case been rotated about its axis of rotation R. As a result, the CD cases 38 are clamped inside the holding opening 16 or holding slot by means of the segments 28, leading to particularly secure positioning in the holding device.

It should be noted at this point that the insert member 14 in the present case is adjustable infinitely in various rotational positions or in a plurality of adjustment steps. Likewise, the insert member 14 can be correspondingly locked in the receiver 12 so that sundry items—such as the CD cases 38 in the present case—can be correspondingly clamped. In the case of adjustment of the insert member 14 in adjustment steps, it would in principle also be conceivable to use corresponding snap-in steps, which allow sundry items to be clamped particularly advantageously inside the holding opening 16.

It will further be seen from FIG. 5 that a pen 42 has been inserted into a receiving opening 40 inside the corresponding segment 28 of the insert member 14. A further pen 44 is located inside the holding opening 16.

The receiving openings 40 in the present case not only serve to accommodate sundry items but, for example, also ensure simple handling of the insert member 14 on rotation or removal from the receiver 12.

Figure 6:
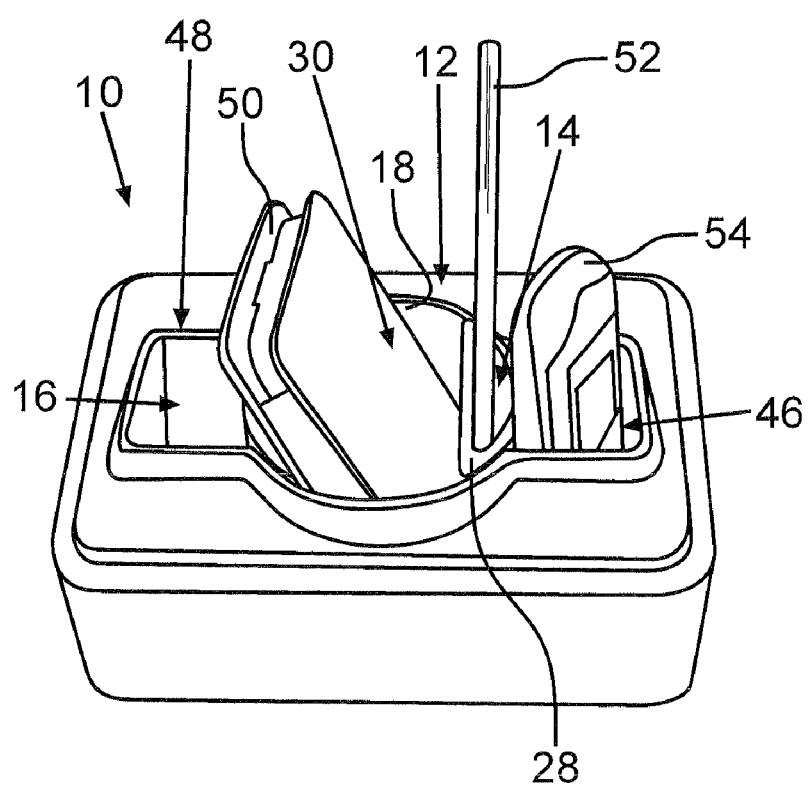
FIG. 6 shows a perspective view of the holding device according to FIGS. 1 to 5, in which the rotationally symmetrical insert member has been so rotated that its holding recess extends at an angle of approximately 90° relative to the holding opening or holding slot of the base body, and in which three separate compartments in which sundry items can be accommodated have been created by means of the two segments of the insert member.

Finally, FIG. 6 shows a perspective view of the holding device, in which the insert member 14 has been so rotated that the holding recess 30 of the insert member 14 extends inside the base body 10 approximately at an angle of 90° relative to the holding slot 16. When the insert member 14 is in this position, the two segments 28 of the insert member 14 separate two storage compartments 46, 48 from the holding recess 30 of the insert member 14. The holding recess 30 of the insert member 14 is thereby bounded by the bays 18 of the base body 10. A total of three compartments is thus formed—the holding recess 30 and the storage compartments 46, 48—which is suitable for accommodating sundry items of different sizes. In the present case, an electronic device 50 is positioned inside the holding recess 30. A pen 52 is located inside the receiving opening 40 of the corresponding segment 28 of the insert member 14. Finally, a mobile telephone 54 is positioned inside the compartment 46.

It will be understood that each of the elements described above, or two or more together, may also find a useful application in other types of constructions differing from the types described above.

While the invention has been illustrated and described as embodied in a holding device for storing sundry items, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed:

1. A holding device for storing sundry items, comprising a base body having a holding opening configured as a holding slot and a receiver configured as a cupholder in a sub-region of said holding opening; an insert member inserted into said receiver of said base body, said insert member having a thoroughgoing holding recess by which opposing segments are separated from one another and being rotatable relative to said base body between one position in which said holding recess of said insert member is in alignment with said holding slot of said base body and an object can be inserted in said holding recess and said holding slot jointly, another position in which said holding recess is inclined at an angle relative to said holding slot and an object can be clamped by said segments in said holding recess and said holding slot, and a further position in which the holding recess extends transversely to said holding slot and three separate compartments are limited by said segments with a first compartment formed in said holding recess of said insert member and two further compartments formed in end portions of said holding slot at both sides of said insert member.

2. A holding device as defined in claim 1, wherein said insert member is rotationally symmetrical and is arranged in said receiver so as to be rotatable about an axis of rotation.

3. A holding device as defined in claim 1, wherein said receiver has a diameter which is larger than a width of said holding slot at least over part of a height.

4. A holding device as defined in claim 3, wherein said receiver is arranged at least approximately centrally in said holding slot.

5. A holding device as defined in claim 1, wherein said holding recess of said insert member is configured so that it is adapted to said holding opening of said base body.

6. A holding device as defined in claim 1, wherein said opposing segments of said insert member are provided with receiving openings.

7. A holding device as defined in claim 1, wherein said base body has an upper side and is provided on said upper side with a border that extends around said holding opening and said receiver of said base body.

8. A holding device as defined in claim 1, wherein said insert member is adjustable infinitely in various rotational positions or in a plurality of adjustment steps.

9. A holding device as defined in claim 1, wherein said base body has a bottom, said insert member being rotatably mounted on said bottom of said body by a pivot bearing.

\* \* \* \* \*